(12) United States Patent
Staffeldt

(10) Patent No.: US 10,729,080 B2
(45) Date of Patent: Aug. 4, 2020

(54) VERTICAL AEROPONIC GROWING APPARATUS

(71) Applicant: Benjamin Jon Staffeldt, Neshkoro, WI (US)

(72) Inventor: Benjamin Jon Staffeldt, Neshkoro, WI (US)

(*) Notice: Subject to any disclaimer, the term of this patent is extended or adjusted under 35 U.S.C. 154(b) by 240 days.

(21) Appl. No.: 15/961,469

(22) Filed: Apr. 24, 2018

(65) Prior Publication Data

US 2018/0317409 A1    Nov. 8, 2018

Related U.S. Application Data

(60) Provisional application No. 62/502,219, filed on May 5, 2017.

(51) Int. Cl.
*A01G 31/02* (2006.01)
*A01G 9/14* (2006.01)
*A01G 31/00* (2018.01)
*A01G 9/02* (2018.01)
*A01G 31/06* (2006.01)

(52) U.S. Cl.
CPC ........... *A01G 31/02* (2013.01); *A01G 9/1438* (2013.01); *A01G 9/022* (2013.01); *A01G 9/025* (2013.01); *A01G 31/06* (2013.01); *A01G 2031/006* (2013.01)

(58) Field of Classification Search
CPC .. A01G 31/02; A01G 2031/006; A01G 31/06; A01G 9/025; A01G 9/023; A01G 9/022
See application file for complete search history.

(56) References Cited

U.S. PATENT DOCUMENTS

| | | | | |
|---|---|---|---|---|
| 4,149,970 A | * | 4/1979 | Atkins | A01C 21/00 47/62 N |
| 4,574,520 A | * | 3/1986 | Arledge | A01G 31/06 47/59 R |
| 4,669,217 A | * | 6/1987 | Fraze | A01G 31/02 47/64 |
| 4,869,019 A | * | 9/1989 | Ehrlich | A01G 31/06 47/62 A |
| 5,501,037 A | * | 3/1996 | Aldokimov | A01G 31/00 47/21.1 |

(Continued)

*Primary Examiner* — Magdalena Topolski
*Assistant Examiner* — Kevin M Dennis
(74) *Attorney, Agent, or Firm* — Northwind IP Law, S.C.; Thomas J. Connelly

(57) ABSTRACT

A vertical aeroponic growing apparatus is disclosed which includes a hollow structure having a top wall, a sidewall, and a bottom wall. A plurality of openings is formed through the sidewall. A thermal, light refractive cover is wrapped around the sidewall. The cover has a plurality of openings formed therethrough which correspond to the plurality of openings formed in the sidewall. A fitting is positioned in each of the plurality of openings in which a plant will be supported. A cap closes off any of the plurality of openings which are not needed to support the fitting. A drain pipe is secured to the bottom wall for allowing excess nutrient laden water to be removed. Lastly, an irrigation tube routes nutrient laden water to the hollow structure. A nozzle attached to an end of the irrigation tube delivers a fine mist of the nutrient laden water to the plant roots.

20 Claims, 2 Drawing Sheets

(56) References Cited

U.S. PATENT DOCUMENTS

| | | | | |
|---|---|---|---|---|
| 5,724,768 | A * | 3/1998 | Ammann, Jr. | A01G 31/02 47/59 R |
| 5,918,416 | A * | 7/1999 | Ammann, Jr. | A01G 31/02 47/58.1 R |
| 5,941,019 | A * | 8/1999 | Guarriello, Sr. | A01G 9/029 47/66.6 |
| 6,276,089 | B1 * | 8/2001 | Boisclair | A01G 31/02 47/60 |
| 6,282,834 | B1 * | 9/2001 | Mossey | A01G 9/1438 47/17 |
| 8,484,890 | B2 * | 7/2013 | Simmons | A01G 31/02 47/62 A |
| 8,667,734 | B2 * | 3/2014 | Johnson | A01G 31/02 47/62 N |
| 9,820,448 | B2 * | 11/2017 | Lempidakis | A01G 9/1438 |
| 10,072,880 | B2 * | 9/2018 | Newsam | F25B 21/02 |
| 10,136,594 | B2 * | 11/2018 | Blank | A01G 31/06 |
| 2005/0246954 | A1 * | 11/2005 | Bissonnette | A01C 1/02 47/62 A |
| 2007/0033866 | A1 * | 2/2007 | Henry | A01G 9/022 47/40.5 |
| 2008/0311392 | A1 * | 12/2008 | Tsu | A01G 9/1438 428/336 |
| 2011/0232190 | A1 * | 9/2011 | Pindus | A01G 31/02 47/62 A |
| 2011/0258925 | A1 * | 10/2011 | Baker | A01G 9/023 47/65.8 |
| 2012/0279126 | A1 * | 11/2012 | Simmons | A01G 31/06 47/62 A |
| 2013/0036669 | A1 * | 2/2013 | Rabii | A01G 31/02 47/62 R |
| 2013/0174483 | A1 * | 7/2013 | Caspar | A01H 4/006 47/65.8 |
| 2013/0180173 | A1 * | 7/2013 | Caspar | A01H 4/006 47/65.7 |
| 2014/0000162 | A1 * | 1/2014 | Blank | A01G 31/06 47/62 A |
| 2014/0311030 | A1 * | 10/2014 | Anderson | A01G 9/247 47/62 A |
| 2015/0040477 | A1 * | 2/2015 | Wang | A01G 31/047 47/62 N |
| 2015/0223418 | A1 * | 8/2015 | Collins | A01G 31/02 47/62 R |
| 2015/0313104 | A1 * | 11/2015 | Cottrell | A01G 22/00 47/62 A |
| 2015/0334928 | A1 * | 11/2015 | Kort | A01G 9/126 47/62 R |
| 2016/0066525 | A1 * | 3/2016 | Duquesnay | A01G 9/025 47/62 R |
| 2016/0135398 | A1 * | 5/2016 | Mathieu | A01G 31/06 47/62 R |
| 2016/0235025 | A1 * | 8/2016 | Bray | A01G 31/06 |
| 2017/0055473 | A1 * | 3/2017 | Baker | A01G 31/06 |
| 2017/0105373 | A1 * | 4/2017 | Byron | A01G 22/00 |
| 2017/0150686 | A1 * | 6/2017 | Erbacher | B65D 43/161 |
| 2017/0282511 | A1 * | 10/2017 | Hwang | B32B 5/024 |
| 2018/0049375 | A1 * | 2/2018 | Chao | A01G 9/0297 |
| 2018/0288951 | A1 * | 10/2018 | Di Battista | A01G 17/06 |
| 2018/0303042 | A1 * | 10/2018 | Daios | A01G 9/1438 |
| 2018/0338439 | A1 * | 11/2018 | Gao | A01G 31/02 |
| 2018/0368346 | A1 * | 12/2018 | Watson | A01G 31/06 |
| 2019/0261583 | A1 * | 8/2019 | DeFoor | A01G 9/022 |
| 2020/0037514 | A1 * | 2/2020 | Massey | A01G 9/24 |

\* cited by examiner

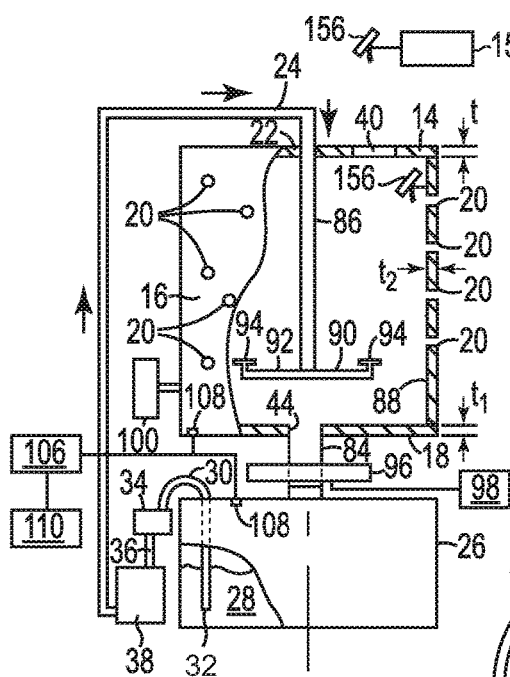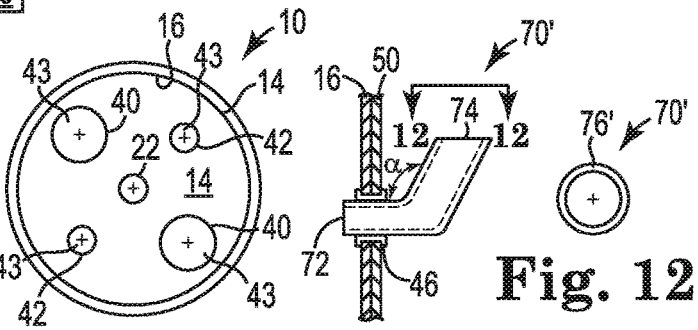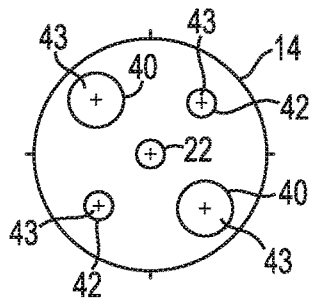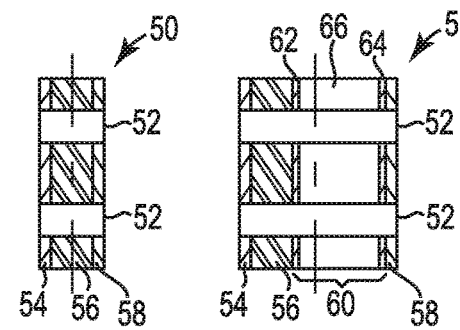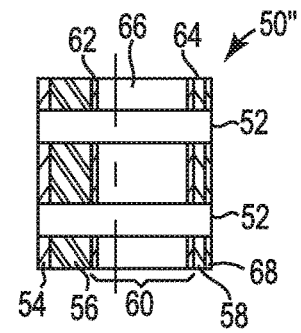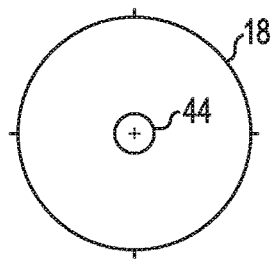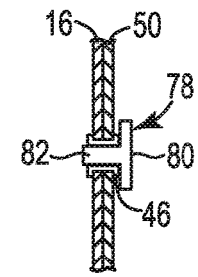

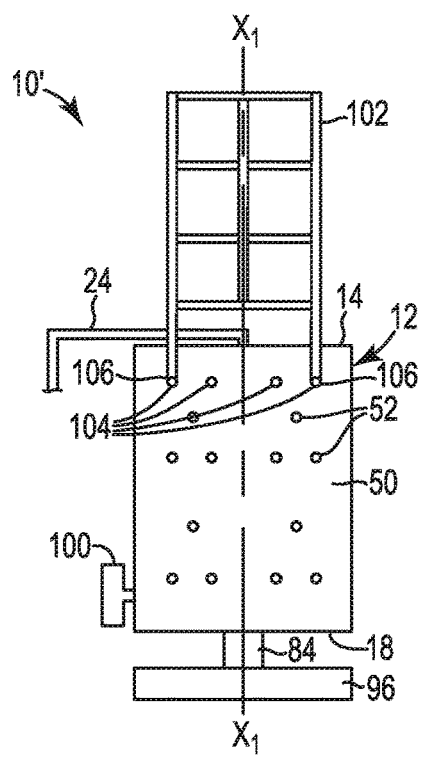
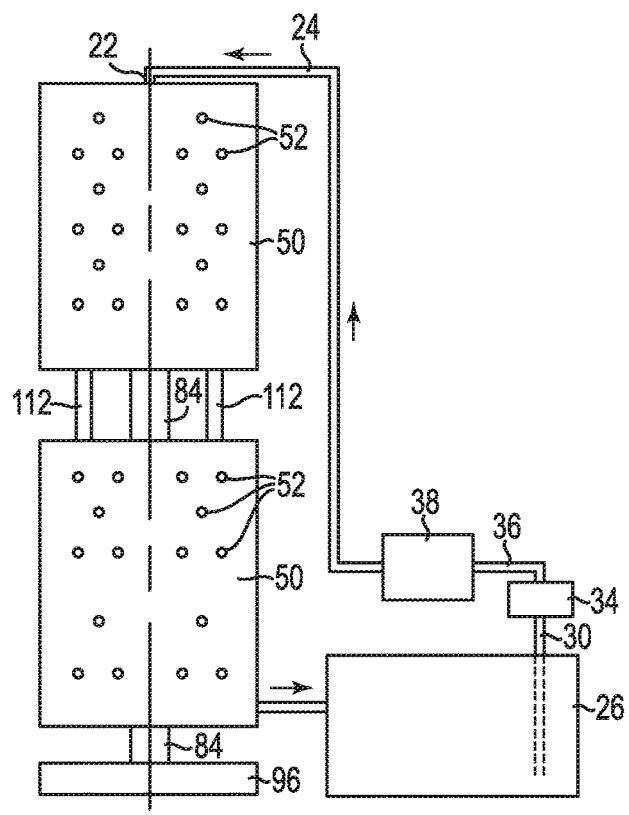
Fig. 14  Fig. 15
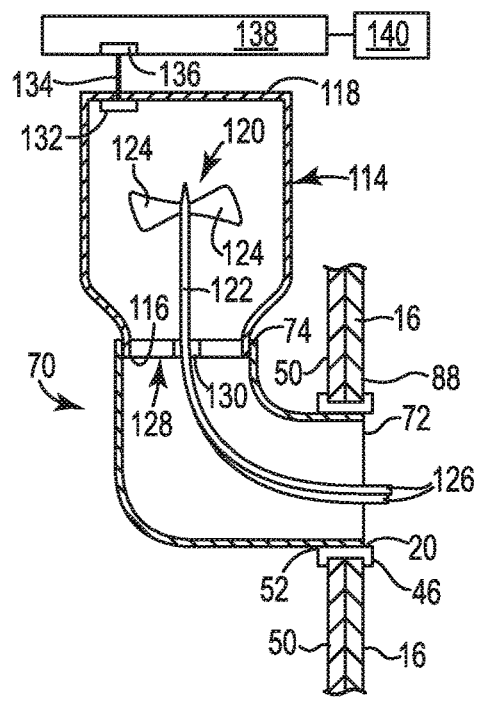
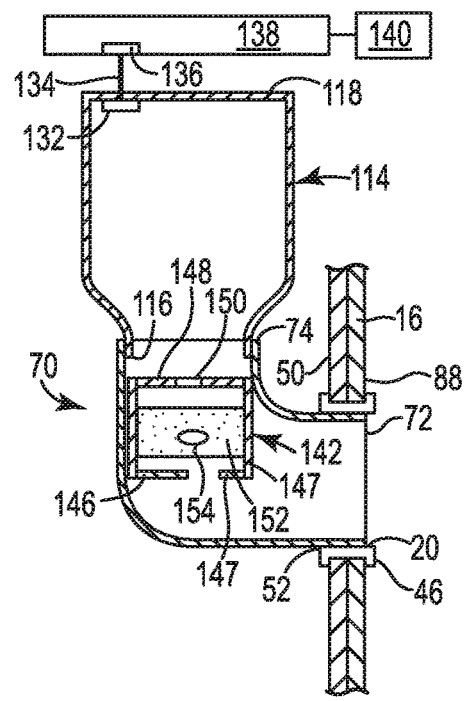
Fig. 16  Fig. 17

VERTICAL AEROPONIC GROWING APPARATUS

CROSS-REFERENCE TO RELATED APPLICATION

This application claims priority under 35 U.S.C. 119 (e), as a non-provisional patent application to Provisional Application 62/502,219, filed May 5, 2017, which is incorporated by reference in its entirety.

FIELD OF THE INVENTION

This invention relates to a vertical aeroponic growing apparatus.

BACKGROUND OF THE INVENTION

Aeroponics is a technique for growing plants without soil by suspending them and constantly misting the roots with nutrient laden water. Many different systems and apparatuses have been invented to grow plants in this manner. However, each such system and apparatus lacks the efficiency and usefulness of the present invention.

SUMMARY OF THE INVENTION

Briefly, this invention relates to a vertical aeroponic growing apparatus. The vertical aeroponic growing apparatus includes a hollow structure having a top wall, a sidewall, and a bottom wall. The top wall has an opening formed therethrough, the sidewall has a plurality of openings formed therethrough, and the bottom wall has an opening formed therethrough. A thermal, light refractive cover is wrapped around the sidewall. The cover has a plurality of openings formed therethrough which correspond to the plurality of openings formed in the sidewall. A fitting is positioned in each of the plurality of openings in which a plant will be supported. Each fitting permits roots of an individual plant to extend into the hollow structure. A cap closes off any of the plurality of openings formed in the sidewall which are not needed to support a fitting. A drain pipe is secured to the opening formed in the bottom wall for allowing excess water to be removed from the hollow structure. Lastly, an irrigation tube is connected between a source of high pressure nutrient laden water to the opening formed in the top wall. The irrigation tube extending into the hollow structure and has at least one nozzle attached to an end thereof for delivering a fine mist of the nutrient laden water the plant roots.

The vertical aeroponic growing apparatus can be hung or suspended from above or be situated on a movable platform. Desirably, when positioned on a movable platform, the movable platform can be constructed so that it can oscillate back and forth or rotate in at least one direction and preferably in two directions. By rotating the platform, one can adjust the amount of sunlight which the plants can receive.

The general object of this invention is to provide a vertical aeroponic growing apparatus. A more specific object of this invention is to provide a vertical aeroponic growing apparatus which is easy to use.

Another object of this invention is to provide a vertical aeroponic growing apparatus which is inexpensive to construct.

A further object of this invention is to provide a vertical aeroponic growing apparatus which is inexpensive to operate.

Still another object of this invention is to provide a vertical aeroponic growing apparatus which is easy to maintain.

Still further, an object of this invention is to provide a vertical aeroponic growing apparatus which will produce an abundance of edible plants.

Other objects and advantages of the present invention will become more apparent to those skilled in the art in view of the following description and the accompanying drawings.

BRIEF DESCRIPTION OF THE DRAWINGS

FIG. 1 is a side view of a vertical aeroponic growing apparatus in the shape of a cylinder and having a cut away portion showing a top wall, a sidewall and a bottom wall, and having a plurality of openings formed in the sidewall.

FIG. 2 is a top view of said top wall.

FIG. 3 is a bottom view of the bottom wall.

FIG. 4 is a side view of a grommet.

FIG. 5 is a top view of the vertical aeroponic growing apparatus showing the thermal, light refractive cover wrapped around the sidewall.

FIG. 6 is a cross-sectional view of a sidewall.

FIG. 7 is a cross-sectional view of a second embodiment of a sidewall.

FIG. 8 is a cross-sectional view of a third embodiment of a sidewall.

FIG. 9 is a side view of a fitting positioned in one of said openings formed in the sidewall.

FIG. 10 is a view taken along line 10-10 of FIG. 9.

FIG. 11 is a side view of an alternative fitting positioned in one of said openings formed in the sidewall.

FIG. 12 is a view taken along line 12-12 of FIG. 11.

FIG. 13 is a side view of one of said openings formed in the sidewall and having a cap positioned therein.

FIG. 14 is a side view of a vertical aeroponic growing apparatus having a trellis attached thereto.

FIG. 15 is a side view showing two vertical aeroponic growing apparatuses stacked in a vertical fashion.

FIG. 16 is a cross-sectional view of a fitting having an enclosure attached thereto in which a plant grows.

FIG. 17 is a cross-sectional view of a fitting having an enclosure attached thereto and having a seed cup retained therein.

DETAILED DESCRIPTION OF THE INVENTION

Referring to FIG. 1, a vertical aeroponic growing apparatus 10 is shown for growing various kinds of plants, especially vegetables for human consumption. Many different varieties of plants, including: vegetables, flowers and herbs, can be grown in the vertical aeroponic growing apparatus 10. By "vegetable" it is meant a plant cultivated for an edible part, such as the leaf of spinach. By "flower" it is meant a plant that is cultivated or appreciated for its blossoms. By "herb" it is meant a plant whose stem does not produce woody persistent tissue and usually dies after each growing season. Examples of some of these plants include, but are not limited to: lettuce, spinach, carrots, tomatoes, peppers, radishes, etc.

The vertical aeroponic growing apparatus 10 includes a hollow structure 12. The hollow structure 12 can vary in size, shape and construction. The hollow structure 12 can be configured as a cylinder, such as a cylindrical barrel, a rectangular cube, a square cube, etc. Desirably, the hollow structure 12 has a cylindrical configuration. More desirably, the hollow structure 12 is a 55 gallon drum. The hollow structure 12 can be formed from a variety of materials. The hollow structure 12 can be formed from plastic, a thermoplastic, a metal, a metal alloy, steel, stainless steel, wood, a composite material, fiberglass, etc. Desirably, the hollow structure 12 is formed from a plastic material. More desirably, the hollow structure 12 is constructed from polypropylene, polyethylene or polyvinyl chloride (PVC).

Referring now to FIGS. 1-3, the hollow structure 12 has a top wall 14, a sidewall 16, and a bottom wall 18. When the hollow structure 12 is constructed in the shape of a cylinder, only one sidewall 16 will be present. If the hollow structure 12 is constructed in the shape of a rectangular cube, then four sidewalls 16, 16, 16 and 16 would be present. The sidewall 16 is secured to the top wall 14 and to the bottom wall 18. The sidewall 16 contains a plurality of openings 20 formed therethrough. The number of openings 20 can vary. Depending on the size of the hollow structure 12, the sidewall 16 can contain from between about 30 to about 100 openings 20. Desirably, at least 40 openings 20 are formed through the sidewall 16. More desirably, less than 80 openings 20 are formed in the sidewall 16. Even more desirably, less than about 60 openings 20 are formed in the sidewall 16. Most desirably, from between about 40 to about 50 openings 20 are formed in the sidewall 16.

The size, shape, and arrangement of each of the plurality of openings 20 can also vary. Normally, each of the plurality of openings 20 has a circular profile. The plurality of openings 20 could be constructed in some other geometrical shape, if desired. Each of the plurality of openings 20 has a diameter of about 0.5 inches or greater. Desirably, each of the plurality of openings 20 has a diameter which ranges from between about 0.5 inches to about 4 inches. More desirably, each of the plurality of openings 20 has a diameter which ranges from between about 0.7 inches to about 3 inches. Even more desirably, each of the plurality of openings 20 has a diameter of greater than about 1 inch. Most desirably, each of the openings 20 has a diameter of greater than about 1.5 inches.

The plurality of openings 20 can be arranged in a particular pattern or be randomly arranged in the sidewall 16. Desirably, the plurality of openings 20 are arranged in a predetermined pattern. The arrangement of the plurality of openings 20 can vary depending on: the kind of plants which are to be grown, the number of plants which are to be grown, the size of the plants which are to be grown, the roots system of each of the plants, the spacing needed for each of the plants, etc. The arrangement of the plurality of openings 20 will occur throughout the entire surface area of the sidewall 16.

It should be understood that two or more different kinds of plants can be grown in the vertical aeroponic growing apparatus 10 at the same time.

Referring again to FIG. 2, the top wall 14 is attached or secured to the hollow structure 12. Alternatively, the top wall 14 could be integrally formed with the sidewall 16. The top wall 14 can be removable secured to the hollow structure 12, if desired. Normally, the top wall 14 will be permanently secured to the hollow structure 12. The top wall 14 can be formed from the same material or from a similar material as was used to construct the sidewall 16 and/or the bottom wall 18. Alternatively, the top wall 14 can be constructed from a different material than that used to construct the sidewall 16 and/or the bottom wall 18. Desirably, the top wall 14 is formed from a plastic or a thermoplastic material, such as polypropylene, polyethylene, or a combination thereof. The top wall 14 can have the shape of a thin plastic disc. The top wall 14 should have a thickness t of at least 0.25 inches. Desirably, the thickness t of the top wall 14 ranges from between 0.25 inches to about 1 inch. The top wall 14 can have one or more openings formed therein. In FIG. 2, a centrally located opening 22 is present. The opening 22 is designed to receive a hollow irrigation tube 24. The irrigation tube 24 can be a rigid or a flexible tube. The irrigation tube 24 can vary in diameter. Desirably, the irrigation tube 24 has a diameter of about 0.25 inches or greater. Desirably, the irrigation tube 24 has a diameter ranging from between about 0.25 inches to about 2 inches. The irrigation tube 24 can be wrapped in a refractive tape or be covered with a refractive paint, if needed. In addition, various components can be added to the irrigation tube 24, such as a water chiller or a heater, to control the temperature of the incoming nutrient laden water 28.

Referring again to FIG. 1, the vertical aeroponic growing apparatus 10 is connected to a reservoir 26 which is capable of holding a quantity of nutrient laden water 28. By "water" it is meant a clear, colorless, odorless, and tasteless liquid, $H_2O$, essential for most plant and animal life. By "nutrient" it is meant a source of nourishment, especially a nourishing ingredient in a food. One or more nutrients can be added to the water. The kind, type and amount of nutrient(s) can vary. The nutrients can change depending upon what kinds of plants are being grown in the vertical aeroponic growing apparatus 10. The nutrients can be added to the water in solid, semi-solid or liquid form. The nutrients can be dissolved in the water. The nutrient laden water 28 can contain from between about 200 parts per million (ppm) to about 1,500 ppm of nutrients. Desirably, the nutrient laden water 28 contains at least about 300 ppm of nutrients. More desirably, the nutrient laden water 28 contains at least about 500 ppm of nutrients. Even more desirably, the nutrient laden water 28 contains at least about 700 ppm of nutrients. Most desirably, the nutrient laden water 28 contains at least about 800 ppm of nutrients.

The reservoir 26 can hold or retain plant food, including but not limited to: nutrients, fish waste, water, or any hydroponic material.

The size, shape and design of the reservoir 26 can vary. The reservoir 26 can be constructed out of a variety of different materials. For example, the reservoir 26 can be made from plastic; from a thermoplastic, such as polypropylene or polyethylene, from a composite material, fiberglass, etc. The reservoir 26 can also be constructed from: metal, a metal alloy, steel, stainless steel, wood, Styrofoam, rubber or some other material. The amount of nutrient laden water 28 which the reservoir 26 can hold can vary. The reservoir 26 should be capable of holding at least five gallons of nutrient laden water 28. Desirably, the reservoir 26 is capable of holding from between about 5 gallons to about 1,000 gallons of nutrient laden water 28. More desirably, the reservoir 26 is capable of holding at least about 10 gallons of nutrient laden water 28.

An outlet tube 30 is present in the reservoir 26 and extends out of the reservoir 26. The outlet tube 30 has an open end 32 located below the level of the nutrient laden water 28. The outlet tube 30 can be a rigid tube or a flexible tube. The diameter of the outlet tube 30 can vary. The outlet tube 30 can have a diameter of from between about 0.25 inches to about 1 inch. Desirably, the outlet tube 30 has a diameter of from between about 0.25 inches to about 0.75 inches. More desirably, the outlet tube 30 has a diameter of about 0.5 inches.

The outlet tube 30 is connected to a filtration manifold 34. The filtration manifold 34 functions to filter contaminate out of the nutrient laden water 28 before the nutrient laden water 28 is routed via a hollow tube 36 to a pump 38. The hollow tube 36 can be a rigid tube or a flexible tube of varying diameter. The pump 38 can vary in size and power depending on the size of the vertical aeroponic growing apparatus 10. The pump 38 is a commercially available item. One supplier of such pumps 38 is Aquatic International Inc. having an office at 17422 Pullman Street, Irvine, Calif. 92614. The Aquatic 8800 pressure booster pump, Model No. 8852-2P02-T421 works well in the vertical aeroponic growing apparatus 10.

The pump 38 may include an atmospheric control for automatic controlling such features as: temperature, timer, remote options and more. A filter (not shown) can be installed upstream of the pump 38 to filter out debris. Various kinds of filters can be used. The size and shape of the filter can vary. The filter can utilize various materials known to those skilled in the art. For example, the filter could be a bio-filter using carbon and rock. Multiple filters can also be employed in different locations, if desired.

The irrigation tube 24 connects the pump 38 to the opening 22 formed in the top wall 14.

Referring again to FIG. 2, the top wall 14 also includes one or more large openings 40. By "large" it is meant an opening having a diameter of at least about 4 inches. Desirably, the large opening 40 has a diameter of from between about 4 inches to about 8 inches. More desirably, the large opening 40 has a diameter of from between about 4 inches to about 6 inches. Even more desirably, the large opening 40 has a diameter of from between about 4 inches to about 5 inches. Two large openings 40, 40 are depicted in FIG. 2. The two large openings 40, 40 are spaced roughly 180 degrees apart. Each of the two large openings 40, 40 functions to allow a person's hand, forearm and upper arm, that portion of an arm located above the elbow, to be easily inserted there through should the need arise to check on the plant roots or adjust something located within the vertical aeroponic growing apparatus 10. Each of the two large openings 40, 40 is shown having a circular profile. However, each large opening 40 could have some other geometrical profile, if desired. Desirably, each of the two large openings 40, 40 has a circular configuration and each has a diameter of about 4 inches or greater. By employing two large, spaced apart openings 40, 40, one can be assured that by inserting a hand, forearm and/or a portion of his or her upper arm into the hollow structure 12, that one can contact almost, if not all, of the interior of the hollow structure 12. In addition, the presence of two large, spaced apart openings 40, 40 allows a person to insert both of his or her right and left hands, forearms and/or upper arms into the hollow structure 12 at the same time.

In addition to the at least one large opening 40, one or more smaller openings 42 can be formed through the top wall 14. Two smaller openings 42, 42 are depicted in FIG. 1. Each of the smaller openings 42, 42 can vary in profile. Desirably, each of the smaller openings 42, 42 can have a circular profile. Each of the smaller openings 42, 42 can have a diameter ranging from between about 0.5 inches to about 3 inches. Desirably, each of the smaller openings 42, 42 has a diameter of less than about 2.5 inches. The two smaller openings 42, 42 are spaced roughly 180 degrees apart. Each of the two smaller openings 42, 42 function to allow a piece of equipment to be connected or attached to the hollow structure 12. For example, it may be advantageous to connect an ultrasonic fogger through one of the openings 42, 42 so that very fine water droplets can be introduced into the vertical aeroponic growing apparatus 10. Likewise, it may be advantageous to connect a device which can introduce an inoculation fungicide into the vertical aeroponic growing apparatus 10. Another use of the smaller opening 42 is to provide an opening for a pump. The pump could be used to introduce air and/or a fog mixture into the vertical aeroponic growing apparatus 10. Those skilled in the art are well be aware of the various kinds of devices that can be attached to the vertical aeroponic growing apparatus 10 through the smaller opening 42.

Still referring to FIG. 2, each of the openings 40, 40 and 42, 42 can be closed off by a cap 43 when the opening 40, 40 and 42, 42 do not need to be exposed. Each cap 43 can vary in size, shape and design. Each of the caps 43, 43, 43 and 43 can be a plug which can be inserted into one of the openings 40, 40 and 42, 42, or be threaded into the openings 40, 40 and 42, 42, or be made to slide over each of the openings 40, 40 and 42, 42. Those skilled in the art are aware of a variety of caps 43 which can mechanically operate to close off each of the openings 40, 40 and 42, 42 when needed.

Referring now to FIGS. 1 and 3, the bottom wall 18 is attached or secured to the hollow structure 12. The bottom wall 18 can be removable secured to the hollow structure 12, if desired. Normally, the bottom wall 18 will be permanently secured to the hollow structure 12. The bottom wall 18 can be formed from the same material or from a similar material as was used to construct the top wall 14 and/or the sidewall 16. Alternatively, the bottom wall 18 could be formed from a different material, if desired. Desirably, the bottom wall 18 is formed from a plastic or thermoplastic material, such as polypropylene, polyethylene or a combination thereof. The bottom wall 18 can have the shape of a thin plastic disc. The bottom wall 18 should have a thickness $t_1$ of at least 0.25 inches. Desirably, the thickness $t_1$ of the bottom wall 18 can range from between about 0.25 inches to about 1 inch.

In FIGS. 1 and 3, the bottom wall 18 is shown having a central opening 44 formed there through. The size and shape of the central opening 44 can vary. The central opening 44 is depicted as having a circular profile. The diameter of the central opening 44 is about 2 inches or greater. Desirably, the central opening 44 has a diameter ranging from between about 2 inches to about 4 inches. More desirably, the central opening 44 has a diameter ranging from between about 2.5 inches to about 4 inches. Even more desirably, the central opening 44 has a diameter ranging from between about 3 inches to about 4 inches. The central opening 44 functions to allow excess the nutrient laden water 28 to be expelled or drained from the hollow structure 12.

Referring again to FIG. 1, the sidewall 16 of the vertical aeroponic growing apparatus 10 also has a thickness $t_2$. The thickness $t_2$ of the sidewall 16 can range from between about 0.1 inches to about 0.5 inches. Desirably, the thickness $t_2$ of the sidewall 16 can range from between about 0.15 inches to about 0.4 inches. More desirably, the thickness $t_2$ of the sidewall 16 can range from between about 0.2 inches to about 0.3 inches. Even more desirably, the thickness $t_2$ of the sidewall 16 can range from between about 0.25 inches to about 0.3 inches. Most desirably, the thickness $t_2$ of the sidewall 16 is about 0.25 inches or less.

The side wall 16 has a surface area which can vary. The surface area is selected based on a number of factors, such as but not limited to: the size of the hollow structure 12, the kinds of plants which are to be grown, the number of plants which are to be grown, the climate in which the vertical aeroponic growing apparatus 10 is to be operated in, the temperature range in which the vertical aeroponic growing apparatus 10 will operate, the amount of light which will be available, the water supply which is available, etc. The surface area of the sidewall 16 should be at least about 10 square feet. Desirably, the surface area of the sidewall 16 should be at least about 15 square feet. More desirably, the surface area of the sidewall 16 should be at least about 20 square feet. Even more desirably, the surface of the sidewall 16 should be at least about 25 square feet. Most desirably, the surface of the sidewall 16 should be at least about 30 square feet.

Referring now to FIG. 4, a grommet 46 is depicted. Each of the plurality of openings 20 formed in the sidewall 16 is surrounding by a grommet 46. By "grommet" it is meant a reinforced eyelet. The grommet 46 has a longitudinal central axis X-X and a horizontal central axis Y-Y. An aperture 48 is formed through the grommet 46 parallel with the horizontal central axis Y-Y. The size of the aperture 48 can vary. Desirably, the aperture 48 has a diameter which ranges from between about 0.5 inches to about 4 inches. More desirably, the aperture 48 has a diameter which ranges from between about 1 inch to about 3 inches. Even more desirably, the aperture 48 has a diameter which ranges from between about 1.25 inches to about 2 inches. Most desirably, the aperture 48 has a diameter which is greater than about 1.5 inch.

The grommet 46 can be formed from a resilient material, such as rubber. The grommet 46 can also be formed from other materials, including but not limited to: any rubber varieties, silicone, plastic, metal, cork, wood, organic compounds, synthetic compounds, clay, or materials that have similar characteristics. Each of the grommets 46 can vary in size, shape and design. The grommet 46 can be a standard grommet, a threaded grommet, a sealing grommets, such as uni-seal grommet, or be of some other design. The grommets 46 are a commercially available item. One supplier of rubber grommets is Atlantic India Rubber Company having an office at 1437 State Highway 1428, Hagerhill, Ky. 41222.

Referring now to FIG. 5, the vertical aeroponic growing apparatus 10 also includes a thermal, light refractive cover 50. The thermal, light refractive cover 50 is in sheet form and can be wrapped around the outside of the sidewall 16 of the hollow structure 12. The thermal, light refractive cover 50 functions to maintain the plant roots at an optimal temperature. The optimal temperature ranges from between about 65° to about 75°. The thermal, light refractive cover 50 limits and/or reflects sun rays and/or heat from directly contacting the hollow structure 12, which houses the roots of the plants. The thermal, light refractive cover 50 can refract over 75% of the light that contacts it. Desirably, the thermal, light refractive cover 50 can refract from between about 75% to about 98% of the light which contacts it. More desirably, the thermal, light refractive cover 50 can refract from between about 80% to about 98% of the light which contacts it. Even more desirably, the thermal, light refractive cover 50 can refract from between about 85% to about 98% of the light which contacts it. Most desirably, the thermal, light refractive cover 50 can refract up to about 98% of the light that contacts it.

The thermal, light refractive cover 50 also increases luminance. By "luminance" it is meant the condition or quality of being luminous. The thermal, light refractive cover 50 furthermore increases the light intensity and/or light availability to the plants by light refraction.

The thermal, light refractive cover 50 surrounds a major portion of the outside of the sidewall 16. Desirably, at least about 75% of the sidewall 16 is covered by the thermal, light refractive cover 50. More desirably, at least 90% of the sidewall 16 is covered by the thermal, light refractive cover 50. More desirably, at least about 95% of the sidewall 16 is covered by the thermal, light refractive cover 50. Even more desirably, at least about 98% of the sidewall 16 is covered by the thermal, light refractive cover 50. Most desirably, the thermal, light refractive cover 50 surrounds the entire sidewall 16.

The thermal, light refractive cover 50 has a plurality of openings 52 formed therethrough. The plurality of openings 52 correspond in location and arrangement to the plurality of openings 20 formed in the sidewall 16. In addition, each of the plurality of openings 52 has a profile which matches the profile of the plurality of openings 20 formed in the sidewall 16. Desirably, each of the plurality of openings 52 has a circular profile. Each of the plurality of openings 52 should have a diameter which is equal to or slightly larger than the diameter of each of the plurality of openings 20 formed in the sidewall 16. Desirably, each of the plurality of openings 52 has a diameter which is equal to the diameter of each of the plurality of openings 20 formed in the sidewall 16. It is also cost effective to make all of the plurality of openings 52 the same size.

Referring now to FIG. 6, the thermal, light refractive cover 50 can be constructed from a variety of materials. The thermal, light refractive cover 50 is a multilayered structure. The thermal, light refractive cover 50 is constructed of three or more layers. The thermal, light refractive cover 50 can be a laminate. By "laminate" it is meant a structure made by uniting two or more layers together. In FIG. 6, the thermal, light refractive cover 50 includes three layers, a first layer 54, a second layer 56 and a third layer 58. The first or inside layer 54 is positioned adjacent to the sidewall 16. The first layer 54 is an anti-condensate/infrared layer. The first layer 54 can be formed from a sheet of thermoplastic material. For example, the first layer 54 can be formed from polypropylene, polyethylene, or a combination of polypropylene and polyethylene. Desirably, the first layer 54 is formed from polypropylene. The thickness of the first layer 54 can vary. Desirably, the first layer 54 has a thickness of at least about 0.1 millimeters (mm). More desirably, the first layer 54 has a thickness of from between about 0.02 millimeters to about 0.3 mm. The first layer 54 is commercially available from a number of suppliers. One such supplier is Crop King having an office at 134 West Drive, Lodi, Ohio 44254.

The second or middle layer 56 is positioned to the outside of the first layer 54. The second layer 56 can be a thermal bubble layer which provides insulation to the hollow structure 12. The second layer 56 can be formed from various plastic or thermoplastic materials which include a plurality of individual compartments or bubbles. The size of the compartments or bubbles can vary. Such a thermal bubble material is commercially available. One such supplier is Cutting Edge Converted Products having an office at 330 Ryder Road, Toledo, Ohio 43607.

The second layer 56 is has a thickness which is greater than the thickness of the first layer 54. Desirably, the second layer 56 has a thickness which is much greater than the thickness of the first layer 54. The second layer 56 can have a thickness which can range from between about 0.25 inches to about 1 inch. Desirably, the thickness of the second layer 56 ranges from between about 0.25 inches to about 0.75 inches. More desirably, the thickness of the second layer 56 ranges from between about 0.25 inches to about 0.5 inches. Even more desirably, the thickness of the second layer 56 is less than about 0.5 inches.

The third or outer layer 58 is a light refractive or reflective layer. By "refractive" it is meant to deflect light from a straight path by refraction. By "reflective" it is meant to throw or bend back light from a surface. The third layer 58 can be formed from a variety of materials. The third layer 58 could be formed from aluminum, a metal, a metal alloy, a composite material, or a nylon material. The third layer 58 is a commercially available material. One supplier of this material is HTG Supply having an office at 20323 Route 19, Unit 6, Cranberry Township, Pa. 16066. When the third layer 58 is formed from nylon, it can have a denier of about 600. By "denier" it is meant a unit of fineness for rayon, nylon, and silk, based on a standard mass per length of 1 gram per 9,000 meters of yarn.

The third layer 58 has a thickness which can range from between about 0.3 millimeters (mm) to about 1.5 mm. Desirably, the thickness of the third layer 58 can range from between about 0.4 mm to about 1.0 mm. More desirably, the thickness of the third layer 58 can range from between about 0.45 mm to about 0.8 mm. Even more desirably, the thickness of the third layer 58 can range from between about 0.45 mm to about 0.7 mm. The thickness of the third layer 58 is less than the thickness of the second layer 56 but greater than the thickness of the first layer 54.

Referring to FIG. 7, an alternative embodiment of a thermal, light refractive cover 50' is shown. The thermal, light refractive cover 50' is made up of four layers which include: a first layer 54, a second layer 56, a third layer 58 and a fourth layer 60. The first, second and third layers, 54, 56 and 58 respectively, are identical to those discussed above with reference to FIG. 6. The fourth layer 60 is sandwiched between the second layer 56 and the third or outer layer 58. The fourth layer 60 is an inflation layer. The fourth layer 60 includes a first outer skin 62 and a second outer skin 64. The first and second outer skins 62 and 64 respectively, can be formed from a plastic material. The first and second outer skins, 62 and 64 respectively, are sealed around their perimeter, such as by forming an ultrasonic bond, or by using an adhesive, a co-adhesive, by using heat, by using pressure, or a combination of heat and pressure. The sealed first and second outer skins, 62 and 64 respectively, form an air pocket 66. The seal (not shown) around the perimeter of the air pocket 66 prevents the air from escaping. The fourth layer 60 has a thickness which can range from between about 0.2 inches to about 1 inch. Desirably, the fourth layer 60 has a thickness which can range from between about 0.25 inches to about 0.75 inches. More desirably, the fourth layer 60 has a thickness which can range from between about 0.25 inches to about 0.5 inches. The fourth layer 60 has a thickness which is greater than the thickness of the first layer 54, the second layer 56 or the third layer 58.

Referring to FIG. 8, a third embodiment of a thermal, light refractive cover 50" is shown. The thermal, light refractive cover 50" is made up of five layers which include: a first layer 54, a second layer 56, a third layer 58, a fourth layer 60 and a fifth layer 68. The first, second, third and fourth layers, 54, 56, 58 and 60 respectively, are identical to those discussed above with reference to FIG. 7. The fifth layer 68 is positioned on the outside of the third layer 58. The fifth layer 68 can be a relatively thin steel material capable of reflecting light and adding strength to the thermal, light refractive cover 50". The steel material has a thickness which can range from between about 0.5 mm to about 1 mm.

Desirably, the fifth layer 68 has a thickness which can range from between about 0.6 mm to about 1 mm. More desirably, the fifth layer 68 has a thickness which can range from between about 0.6 mm to about 0.8 mm. Even more desirably, the fifth layer 68 has a thickness which can range from between about 0.6 mm to about 0.7 mm. The steel material is commercially available. One supplier of this steel material is McElroy Metal having an office at 5123 Terminal Drive, McFarland, Wis. 53558.

Alternatively, the fifth layer 68 can be a fabric material. The fabric material can be of any color or be of multiple colors. The fabric material can have one or more designs printed thereon. When the fifth layer 68 is formed from a fabric material, light is able to penetrate the fabric material and is reflected back by the third light refractive layer 58. The fabric material has a thickness which can range from between about 0.5 mm to about 1 mm. Desirably, the fabric material has a thickness which can range from between about 0.6 mm to about 1 mm. More desirably, the fabric material has a thickness which can range from between about 0.6 mm to about 0.8 mm. Even more desirably, the fabric material has a thickness which can range from between about 0.6 mm to about 0.7 mm. The fabric material is commercially available. One supplier of this fabric material is JoAnne Fabrics which has many retail shops throughout the State of Wisconsin.

The overall thickness of any of the thermal, light refractive covers 50, 50' or 50" can vary in thickness. The overall thickness of the thermal, light refractive covers 50, 50' or 50" can be about 2 inches or less. Desirably, the thermal, light refractive cover 50, 50' or 50" will have a thickness of less than about 1.5 inches. More desirably, the thermal, light refractive cover 50, 50' or 50" will have a thickness of less than about 1 inch. Even more desirably, the thermal, light refractive cover 50, 50' or 50" will have a thickness which ranges from between about 0.2 inches to about 1 inch. Most desirably, the thermal, light refractive cover 50, 50' or 50" will have a thickness which ranges from between about 0.3 inches to about 0.75 inches.

It should be understood that the thermal, light refractive covers 50, 50' or 50" include at least three layers 54, 56 and 58 and each layer can perform a different function. The thermal, light refractive cover 50, 50' and 50" can be constructed of various materials that can perform the same or a similar function. Additional materials that can be used to construct portions of the thermal, light refractive covers 50, 50' or 50", include: panda film, Mylar®, diamond foil, a blanket, polyester, cotton, tin, aluminum, blackout canvas, bubble foil, alloys, or any combination thereof. Any materials with similar characteristics can be used to increase the thermal quality, light refraction or heat refraction of the hollow structure 12.

The thermal, light refractive covers 50, 50' or 50" can be secured to the hollow structure 12 in a variety of ways known to those skilled in the art. For example, the thermal, light refractive covers 50, 50' or 50" can be secured to the hollow structure 12 by using an adhesive, an adhesive tape, glue, magnets, hook and loop fasteners, Velcro®, by using a chemical bond, by using one or more mechanical fasteners, etc. In addition, the thermal, light refractive covers 50, 50' or 50" could contain a zipper. The thermal, light refractive covers 50, 50' or 50" should be capable of being easily removed, should one wishes to clean the hollow structure 12.

It should be understood that the thermal, light refractive covers 50, 50' or 50" could include more than five layers, if desired. In addition, the thermal, light refractive covers 50, 50' or 50" can be formed from one or more stretchable and/or flexible materials, if desired.

Referring now to FIGS. 9-10 and 16, the vertical aeroponic growing apparatus 10 further includes a fitting 70. The fitting 70 can vary in size, shape and design. The fitting 70 is positioned in each of the plurality of openings 20, formed in the sidewall 16, and passes through one of the plurality of openings 52 formed in the thermal, light refractive covers 50, 50' or 50" respectively. The fitting 70 is a hollow member which will support a plant (see FIG. 16). The fitting 70 includes an angle of bend α. This angle of bend α can vary. The angle of bend α can range from between about 75° degrees to about 150° degrees. More desirably, the angle of bend α can range from between about 90° to about 140°. Even more desirably, the angle of bend α can range from between about 90 degrees to about 135 degrees. Most desirably, the angle of bend α can range from between about 90 degrees to about 130 degrees. In FIG. 9, the fitting 70 has a right angle bend (an angle of 90°), such as an elbow.

Referring now to FIGS. 11 and 12, an alternative embodiment of a fitting 70' is shown. The fitting 70' is bent at an angle of about 135'.

Each of the fittings 70 or 70' can be constructed from various materials. For example, each of the fittings 70 or 70' can be formed from: plastic, a thermoplastic, a composite material, etc, A Lasco® polyvinyl chloride (PVC) fitting is commercially available. Alternatively, a custom molded polypropylene fitting can also be used. Each of the fittings 70 or 70' can be pressed, inserted or be pushed into one of the plurality of openings 20 formed in the sidewall 16 of the hollow structure 12. Each of the fittings 70 or 70' can be manually adjusted or be manipulated as needed. In addition, each of the fittings 70 and 70' can include one or more branches to increase the number of grow sites per opening 20. There is no limitation to the amount of expansion off of a single fitting 70 or 70'. The fittings 70 or 70' cooperate with the respective grommet 46 to form a secure attachment.

Each of the fittings 70 or 70' has a first end 72 and a second end 74. Both the first end 72 and the second end 74 are open. The first and second ends 72 and 74 can be constructed to have the same size openings. Alternatively, the first end 72 can have an opening that is smaller, equal to, or greater than the opening formed in the second end 74. Desirably, the first end 72 will have the same size opening as the second end 74. The opening formed in the first and second ends, 72 and 74 respectively, can range from between about 1 inch to about 4 inches. Desirably, the opening formed in the first and second ends, 72 and 74 respectively, can range from between about 1 inch to about 3 inches. More desirably, the opening formed in the first and second ends, 72 and 74 respectively, can range from between about 1.25 inches to about 2 inches. Most desirably, the opening formed in the first and second ends, 72 and 74 respectively, is about 1.6 inches or 1¹³⁄₁₆ of an inch.

Referring again to FIGS. 9-12, the fitting 70 has a wall 76 and the fitting 70' has a wall 76'. The thickness of the walls 76 and 76' can vary. Generally, the thickness of the walls 76 and 76' is less than about 0.2 inches. Desirably, the thickness of the walls 76 and 76' is less than about 0.15 inches. More desirably, the thickness of the walls 76 and 76' is less than about 0.1 inches. The thickness of the wall 76 or 76' can remain the same or can vary over the length of the fitting 70 or 70'. The fittings 70 and 70' can be formed from various materials. For example, the fittings 70 and 70' can be formed from plastic, a thermoplastic, a composite material, a metal, aluminum, etc. The fittings 70 or 70' can be formed from polypropylene, polyethylene, or a combination thereof.

Each of the fittings 70 or 70' is sized and configured to pass through one of the plurality of openings 52 formed in the thermal, light refractive covers 50, 50' or 50" and then frictionally fit into the grommet 46 which surround each of the plurality of openings 20 formed in the sidewall 16. Each of the fittings 70 or 70' will snugly fit into and be retained by the grommet 46 without the need for a mechanical fastener, such as threads, lock washers, brackets, etc. Each of the grommets 46 is resilient and is sized to accommodate the first end 72 of the fitting 70 or 70'. Each of the grommets 46 will assist in retaining the fitting 70 or 70' in one of the plurality of openings 20.

Referring now to FIG. 13, a cap 78 is shown which is capable of closing off one of the plurality of openings 20, formed in the sidewall 16, which is not needed to support a fitting 70 or 70'. When the vertical aeroponic growing apparatus 10 is used, one may not need to place a fitting 70 or 70' in each of the plurality of openings 20 because of the kinds of plants to be grown. A large leafy plant may need more growing space than some other variety of plant. Therefore, the plants may be spaced further apart. Likewise, a plant with a large quantity of roots may need to be separated from adjoining plants by a larger distance. In these cases, one of the caps 78 can be employed to close each of the openings 20 which are not being used. The cap 78 can be constructed from various materials. The cap 78 can be made of plastic, a thermoplastic, a composite material, etc. The cap 78 can be made from polypropylene, polyethylene or a combination thereof. The cap 78 includes an enlarged head 80 integrally connected to a cylindrical, elongated stem 82. The stem 82 is sized to snugly fit into the aperture 48 formed in the grommet 46. The stem 82 is held in place by a frictional fit. The stem can contain a taper, if desired.

Returning to FIG. 1, the vertical aeroponic growing apparatus 10 also includes a drain pipe 84 which is secured to the opening 44 formed in the bottom wall 18. The drain pipe 84 can vary in size. The drain pipe 84 can be constructed from a variety of materials. Typically, the drain pipe 84 is made from plastic, such as polypropylene, polyethylene or polyvinyl chloride (PVC). Other materials known to those skilled in the art can also be used. The drain pipe 84 allows excess nutrient laden water 28, or water from which the nutrients have been removed, to exit or be removed from the hollow structure 12.

Still referring to FIG. 1, the vertical aeroponic growing apparatus 10 also includes the irrigation tube 24 which was explained earlier. The irrigation tube 24 is connected between the pump 38 and the opening 22 formed in the top wall 14 of the hollow structure 12. The pump 38 is a source of high pressure nutrient laden water 28. The pump 38 should be able to supply the nutrient laden water 28 to the hollow structure 12 at a pressure which can range from between about 50 pounds per square inch (psi) to about 200 psi. Desirably, the pump 38 should be able to supply the nutrient laden water 28 to the hollow structure 12 at a pressure which can range from between about 90 psi to about 150 psi. More desirably, pump 38 should be able to supply the nutrient laden water 28 to the hollow structure 12 at a pressure of about 120 psi.

The irrigation tube 24 can extend into the hollow structure 12 or it can be fluidly connected to a hollow wand 86, as shown. The irrigation tube 24 or the wand 86 can branch off in a horizontal direction and extend outward towards an inside surface 88 of the hollow structure 12. A simple T-shaped connection is shown in FIG. 1. However, any type of connection can be utilized. Such different types of connections are well known to those skilled in the art. As depicted, the wand 86 branches sideways into two hollow tubes 90 and 92. At the end of each of the two hollow tubes, 90 and 92 is a nozzle 94. The nozzle 94 is capable of delivering a fine mist of nutrient laden water 28 to the plant roots. The roots of each plant, see FIG. 16, will extend into the hollow structure 12 through each of the first ends 72 of the fittings 70 or 70". The nozzle 94 is a commercial available item.

Still referring to FIG. 1, a mechanical mechanism 96 is secured to the hollow structure 12. The mechanical mechanism 96 functions to rotate and/or oscillate the hollow structure 12. The mechanical mechanism 96 can be a rotational platform similar to a lazy Susan or be of some other construction. The hollow structure 12 can be made to rotate in a single direction or in opposite directions. By rotating the hollow structure 12, one can adjust the amount of sunlight which the plants can receive. Desirably, the mechanical mechanism 96 will be able to rotate the hollow structure 12 both clockwise and counterclockwise. The mechanical mechanism 96 could also be designed to cause the hollow structure 12 to oscillate, if desired. The mechanical mechanism 96 can be secured to the bottom wall 18 or be spaced away from the bottom wall 18. In FIG. 1, the mechanical mechanism 96 is spaced a short distance away from the bottom wall 18 and is designed to allow the drain pipe 84 to pass through it. Various kinds and types of mechanical mechanisms 96, such as movable platforms, rotational devices, etc. are well known to those skilled in the art and can be utilized. Alternatively, the vertical aeroponic growing apparatus 10 could be mounted on a stationary platform.

The mechanical mechanism 96 can include a timer for controlling the rotation of the vertical aeroponic growing apparatus 10. The timer can also control the speed of rotation. For example, an automatic light sensing unit can be used to measure the rate of rotation. Timed rotations can be controlled by light calculators which can adjust the rotation or movement of the platform.

The mechanical mechanism 96 can be designed to allow the hollow structure 12 to rotate in a given direction, at a set speed or at a variable speed, for a certain period of time. The mechanical mechanism 96 can be controlled by a controller/timer 98. The controller/timer 98 can control the direction of rotation or oscillation, the speed of rotation or oscillation, and the time of rotation or oscillation. For example, the controller/timer 98 can be programmed to cause the hollow structure 12 to rotate in a certain direction for a set period of time and then be shut off. At a later time, the controller/timer 98 can turn the mechanical mechanism 96 on again and cause the hollow structure 12 to rotate in the same direction at the same initial speed or cause the hollow structure 12 to rotate in a reverse direction at the same speed or at a different speed.

The vertical aeroponic growing apparatus 10 utilizes space by using aeroponics. This is achieved by growing plants vertically in the hollow structure 12 using the plurality of openings 20 formed in the sidewall 16. The fittings 70 and 70' are placed in each of the plurality of openings 20 and 52 and a plant is positioned in each of the fittings 70 and 70', The roots of the plants extend into the hollow structure 12 and are sprayed with a fine mist of nutrient laden water 28, on an intermittent or continuous basis, thereby eliminating the need for soil. The plants are suspended in air and hang from each of the fittings 70 and 70'. The fine mist of nutrient laden water 28 is achieved by pulling the nutrient laden water 28 from the reservoir 26 via the high pressure pump 38. The pump 38 is connected to the nozzles 94, 94, each of which creates very fine water droplets, which are then directed to the roots of each plant. This fine mist of nutrient laden water 28 will feed the roots of the plants. The micron size of the water droplets classifies this as a true aeroponic apparatus 10, unlike any other vertical growing system.

Alternatively, the vertical aeroponic growing apparatus 10 could be hung from a rafter, a beam, or some other overhead support, such as by a swivel (not shown). The swivel can be rotated or oscillated manually, or by the mechanical mechanism 96, or by a motor, or by an electrical device. The mechanical mechanism 96 can be constructed so that it can oscillate back and forth, or rotate in a single direction, or in two opposite directions. The mechanical mechanism 96 could be made to rotate through 360 degrees. Alternatively, the mechanical mechanism 96 could be made to rotate from 0° to about 180°, and then reverse directions and rotate from about 180° back to 0°. Another option is to construct the mechanical mechanism 96 such that it can rotate in a single direction, at a certain speed, through any number of degrees. The speed of rotation and the degrees of rotation can be adjusted. The ability to oscillate, rotate, or move the vertical aeroponic growing apparatus 10 is beneficial in increasing the amount of sunlight or artificial light which is available to the plants.

The mechanical mechanism 96 allows the vertical aeroponic growing apparatus 10 to operate when only a limited amount of light is available. The rotation or oscillation caused by the mechanical mechanism 96 also helps the vertical aeroponic growing apparatus 10 to be used indoors in cold winter months, such as when the plants are growing inside a building and the vertical aeroponic growing apparatus 10 is positioned adjacent to a window, or in a greenhouse.

The use of the thermal, light refractive cover 50, 50' or 50" in conjunction with a mechanical mechanism 96 reduces the need for additional lighting.

Still referring to FIG. 1, the vertical aeroponic growing apparatus 10 further includes a cooling fan/module 100 which can be used to cool or maintain the temperature within the hollow structure 12. The cooling fan/module 100 can be activated when needed. Depending on the kinds of plants being grown, a selective temperature range can be set and the cooling fan/module will activate the cooling fan when needed to maintain the optimal temperature range.

Referring now to FIG. 14, a vertical aeroponic growing apparatus 10' is shown having a trellis 102 attached to the hollow structure 12. By "trellis" it is meant a structure of open latticework, especially one used as a support for creeping plants. The trellis 102 can vary in size, shape and configuration. The trellis 102 can be constructed from various materials. For example, the trellis 102 can be formed from plastic, a thermoplastic, metal, wood, a composite material, etc. Desirably, the trellis 102 is formed from polypropylene, polyethylene or polyvinyl chloride (PVC). The trellis 102 can extend upward from the top wall 14 of the hollow structure 12 any desired distance. For example, the trellis 102 could extend upward from the top wall 14 by a distance of from between about 3 feet to about 10 feet. Desirably, the trellis 102 will extend upward from the top wall 14 by a distance of at least about 4 feet. More desirably, the trellis 102 will extend upward from the top wall 14 by a distance of at least about 5 feet. Even more desirably, the trellis 102 will extend upward from the top wall 14 by a distance of at least about 6 feet. Most desirably, the trellis 102 will extend upward from the top wall 14 by a distance of less than about 8 feet.

As clearly shown in FIG. 14, the trellis 102 is secured to a top row of openings 104 by two or more fasteners 106, 106. Two fasteners 106, 106 are depicted in FIG. 14. The top row of openings 104 passes through both the sidewall 16 and the thermal, light refractive cover 50, 50' or 50". All of the openings located in the top row 104 do not have to be utilized but could be, if required. The fasteners 106, 106 can be any kind of mechanical fasteners known to those skilled in the art. For example, each of the fasteners 106, 106 could be a hex headed bolt which has a washer, a lock washer, and a nut threaded onto its free end (not shown).

The vertical aeroponic growing apparatus 10 is unique in that it combines the use of the thermal, light refractive cover 50, 50' or 50" along with the use of a mist of highly oxygenated nutrient laden water 28 allows for better plant health than any other known aeroponic system available today. By "oxygenated" it is meant to treat, combine, or infuse with oxygen. By "highly oxygenated" it is meant water having an oxygen content of at least about 25%. Desirably, the water has an oxygen content of at least about 50%. More desirably, the water has an oxygen content of at least about 95%. Even more desirably, the water has an oxygen content which ranges from between about 25% to about 95%. Most desirably, the water has an oxygen content which ranges from between about 30% to about 75%. The higher the content of oxygen in the water, the better the vertical aeroponic growing apparatus 10 performs.

Referring again to FIG. 1, the vertical aeroponic growing apparatus 10 can be monitored by a sensor system 106, such as is available from Osmo®. The Osmo® system employs a plurality of sensors 108, two of which are shown. The sensors 108, 108 can monitor a variety of items, including but not limited to: air temperature, air temperature in several locations, water temperature, the level of dissolved oxygen, water level, pH level, parts per million (ppm) level of the makeup of the nutrients of minerals contained in the water, light level, nutrient levels separate from the ppm levels, biological activity, etc. The sensors 108, 108 can also provide video or security for the entire vertical aeroponic growing apparatus 10. All of the readings from the sensors 108, 108 can be sent to a computer 110 and be displayed on a computer screen or monitor. Alternatively, all of the readings from the sensors 108, 108 can be sent to a computer tablet, a smartphone, etc. The sensor system 106 can also be monitored from a remote location, anywhere in the world. The readings and data that is sensed can be recorded and archived for record keeping purposes.

Another option is the addition of a device which can perform one or more predetermined functions. For example, a temperate gauge could be used to monitor the temperature of the nutrient laden water 28 twenty four hours a day.

It is also possible to house the vertical aeroponic growing apparatus 10 in various kinds of structures (not shown). Such structures can include, but are not limited to: a greenhouse, a grow tent, an outdoor building, a framework which can support a covering material, inside a lean to, in a translucent glass cube, in a plastic cube, or in some other see through structure. Other structures can also be utilized. The vertical aeroponic growing apparatus 10 can also be positioned below or under a trellis which can provide a canopy for supporting the vertical aeroponic growing apparatus. The plants in the vertical aeroponic growing apparatus 10 can then grow up, down and all around the trellis.

Furthermore, positioned on or around the structure in which the vertical aeroponic growing apparatus 10 is situated, can be numerous controllers (not shown) which can include, but not limited to: dehumidifiers, humidifiers, heaters, cooling systems, $CO_2$ enrichment systems, UV sterilization systems, systems for oxygenating the water and/or the air, water purification systems, ionization systems, deionization systems, carbon filtration systems for the air and/or water, mold filtration systems, baffle cooling systems, etc.

Referring now to FIG. 15, the vertical aeroponic growing apparatus 10 can include two or more hollow structures 12 connected together in some fashion. For example, one hollow structure 12 can be positioned above a second hollow structure 12 and be secured by supports 112. Two supports 112, 112 are depicted in FIG. 15. Alternatively, a hollow structure 12 can be positioned to the side of another hollow structure 12.

In FIG. 15, when one hollow structure 12 is positioned vertically above a second hollow structure 12, the upper hollow structure 12 can have its drain pipe 84 connected to the opening 22 of the lower hollow structure 12. This enables the two hollow structures 12, 12 to become one unit. The first hollow structure 12 can drain through the drain pipe 84 to the second hollow structure 12. The drain pipe 84 could include one or more fittings, nuts, grommets, and/or lock washers, to secure it in place. The drain pipe 84 can be installed in various locations on the upper hollow structures 12 but normally is located in the middle of the bottom wall 18 or in the sidewall 16 near the bottom wall 18.

Referring now to FIG. 16, a fitting 70 is shown extending through an opening 52 formed in a thermal, light refractive cover 50, and through an opening 20 formed in the sidewall 16. The fitting 70 has a first open end 72 and a second open end 74. The first open end 72 is adjacent to the inside surface 88 of the hollow structure 12. An enclosure 114 in the shape of a jar is turned upside down. The enclosure 114 has an open first end 116 and a closed second end 118. The open first end 116 is attached to the second end 74 of the fitting 70 such that the enclosure 114 is located outside of the hollow structure 12. The enclosure 114 is transparent. By "transparent" it is meant capable of transmitting light so that objects or images can be seen as if there were no intervening material. The enclosure 114 can be formed from a variety of material including but not limited to: glass, clear plastic, clear Plexiglas, etc. The enclosure 114 creates a mini greenhouse.

The fitting 70 is designed to support a plant 120 such that the plant 120 can extend out of the open second end 74 and enter into the enclosure 114. A support member 128 having an opening 130 formed therethrough can be positioned in the second end 74 of the fitting 70 to retain the plant 120 in a vertical orientation. The support member 128 is optional, and may not be needed for certain kinds of plants 120. The plant 120 has a stem 122 that may have one or more leaves 124, 124 secured thereto, depending on its maturity. The plant 120 also has one or more roots 126 which extend through the open first end 72 of the fitting 70. As the plant 120 and its roots 126 grow, the roots 126 will exit the open first end 72 of the fitting 70 and extend into the hollow structure 12. The roots 126 will continue to grow as they are nourished by the nutrient laden water 28.

The enclosure 114 also includes an electrical connector or plug 132. The electrical connector or plug 132 can be connected by an electrical wire 134 to an electrical connector or plug 136 associated with a light source 138. The light source 138 can include light emitting diodes (LED) lights, incandescent lights bulbs, fluorescent lights, or any other kind of lights known to those skilled in the art. The light source 138 can be connected to and controlled by a timer 140. The light source 138 will provide needed light for the plant 120 to grow and the nozzles 94, 94 (shown in FIG. 1), will provide a very fine mist of nutrient laden water 28 on an intermittent basis to feed the plant 120.

Referring now to FIG. 17, the structure shown in FIG. 16 is again present. Instead of the plant 120 being present, a retainer 142 is positioned adjacent to or slightly below the open second end 74 of the fitting 70. The retainer 142 has a sidewall 144 having a bottom wall 146 and a top wall 148. The bottom wall 146 has an opening 147 formed therein. Alternatively, the bottom wall 146 can be formed from a material that is perforated or scored such that the material covering the opening 147 can be easily removed. The top wall 148 can be constructed from a material that can be easily punctured, torn open, broken, penetrated, perforated, scored, etc. Alternatively, the top wall 148 can be designed to be peeled back or be peeled off, similar to a peelable lid on a coffee capsule.

The retainer 142 can be formed from various materials. For example, the retainer 142 can be formed from cardboard, corrugated paper, thick paper, plastic, Styrofoam, etc. If the opening 147 formed in the bottom wall 146 is covered, this covering is removed to expose the opening 147. The top wall 148 is punctured, broken, torn open or peeled back to create an opening 150 before the retainer 142 is positioned in the fitting 70. The retainer 142 holds a substrate 152 having a seed 154 enclosed therein. By "substrate" it is meant a material or substance on which an enzyme acts; a surface on which an organism grows or is attached; or an underlying layer. The substrate 152 can be formed from a variety of materials. For example, the substrate 152 can be formed from a foam, such as an open cell foam, from polypropylene, from cardboard, from natural fibers or synthetic fibers, from a combination of natural and synthetic fibers, etc. The fibers can be grouped into a clump or ball so as to stay in the retainer 142. The seed 154 can be the seed of any plant 120 one wishes to grow in the vertical aeroponic growing apparatus 10. One or more seeds can be enclosed by the substrate 152, if desired.

The retainer 142 is positioned in the open second end 74 of the fitting 70. The light and heat within the enclosure 114 will cause the seed to germinate. By "germinate" it is meant to cause to sprout or grow; to come into existence. As the seedling grows, the nutrient laden water 28 will contact its roots and provide nourishment. The seedling will mature into a plant 120, as depicted in FIG. 16. When the plant 120 is mature, it can be harvested.

Returning to FIG. 1, it should be understood that the vertical aeroponic growing apparatus 10 can include additional devices, sensors and items to monitor the growth of the plants 120 and to alert the operator should an emergency occur. For example, a surveillance camera 156, which is electrically connected to a monitor 158, can be employed to monitor the vertical aeroponic growing apparatus 10. One or more cameras 156, 156 can be used. Two cameras 156, 156 are depicted in FIG. 1. The cameras 156, 156 can be located inside the hollow structure 12, be located outsides of the hollow structure 12, or be positioned both within and outside of the hollow structure 12. In FIG. 1, one camera is positioned within the hollow structure 12 and the second camera 156 is positioned outside of the hollow structure.

The vertical aeroponic growing apparatus 10 can also include one or more inline meters (not shown). The inline meters can measure the water flow, temperature, pressure, etc.

Spectrums of light can also be controlled, along with light cycle pumps, timers and any other components. Various solenoid valves, nutrient injectors; etc. can also be used. Various other sensors can also be added and monitored manually.

Various types of meters can be also be used with the vertical aeroponic growing apparatus 10. For example, a $CO_2$ enrichment system may be utilized. Water heaters and/or water chillers can also be used. UV sterilization may be added to any part of the vertical aeroponic growing apparatus 10 to create a sterile environment for the plants 120, and the nutrient laden water 28 being fed to the plants 120. The vertical aeroponic growing apparatus 10 can also utilize various attachments to create a pressure washer (not shown) with the pump 38 or with another pump. The pressure washer is convenient for cleaning the vertical aeroponic growing apparatus 10. Furthermore, an accumulator tank (not shown) can be employed to maintain proper water pressure.

Solar power can be used, by utilizing solar panels, to harness the power of the sun to create energy for the vertical aeroponic growing apparatus 10. Solid or flexible solar panels may be used. Portable or fixed, large, medium or small panels may be used. The materials to construct the panel are limitless. The solar panels can be mounted on the top wall 14 or on the side of a containment building which houses the vertical aeroponic growing apparatus 10. Alternatively, the solar panels can be located around the entire growing system. The solar panels could also be added to the thermal, light refractive material 50 in a variety of ways. This creates an independent, off-grid type of application. It further creates an eco-friendly energy for our growers.

Wind power can be used by utilizing wind turbines to harness the power of wind to create energy for the vertical aeroponic growing apparatus 10. The materials to construct the wind turbines are limitless. They may operate and bank energy in AC or DC form and can include converters and/or extra additions to increase the panel effectiveness and performance. The wind turbines may be added on or around the entire growing system. The wind turbines will create an eco-friendly energy source for our growers.

UV sterilization with UV sterilization bulbs such as LED or fluorescent or HID type fixtures can be used to protect the plants from infective bacteria or pathogens. The root 126 of the plants 120 can be sterilized by using light. The water holding tank can also be sterilized with this technology. A UV sterilization bulb can be mounted on the hollow structure 12, or on a supporting platform.

Electrical Nitrification of the roots 126 of the plants 120 and/or the water "ENIT" can be achieved by running a selected current of electricity through the water which creates a natural nitrification process phenomenon. This is currently achieved by AC/DC current leads being put into the water at a regulated voltage at certain intervals. This creates small thunderstorms inside the root chambers through pressure and a micronized solution with a base electrical conductivity achieved with earth mined nutrients or other chemical formulas.

Plant Energy Harvesting "PEN" can be achieved by implanting a metal probe inside each plant grow site and connecting a wired lead to a one way diode and a battery or converter to bank the energy in AC/DC form. This process is a phenomenon that allows our vertical aeroponic growing apparatus 10 to create its own energy source that's harvestable by the user or by "ART", the artificially intelligent interface. The aeroponic atmosphere allows for more plants 120 in a small space and creates a dense, high energy source, in conjunction with the aeroponics, and a media less root zone only found with aeroponics. Different plant species emit a different energy source and different voltages. Sage being the highest voltage we have tested. This technology of plant powered energy is very exciting and very new.

Lighting may be added to the growing structure or around it with a hanger. Each individual grow-site may also be lit with individual LED diodes, not limited to a set number of lights or size. The wires are very small and installed behind the thermal wrap to achieve this. Larger lights may be added with straps, chains or rods and pulleys. Any lighting technology, such as LED, MH, HPS, HID, T5 or fluorescent may be used. The function of the light is to support the plants 120 need to photosynthesis light to grow indoors. The light will also support solar panels and certain parts of the garden, if needed.

A nutrient density meter can be used to achieve measurable nutrients inside the plants 120. This further educates the user about the quality of the food they are growing. It can measure elemental variations of the food and minerals from A-Z. This is achieved with a meter such a Brix meter, a Nutrimeter, a Nutrameter, a Cronometer or a Refractometer. The main goal is to completely achieve the plant materials measurement with the meter and then log the measurements into a program, such as: Cronometer or ART. This allows a person to acquire a database of measurements.

An airstone and a bubbler can be installed to create a fully oxygenated system. They may be added to the structure of either. This is achieved by using a pump and tubing with an airstone similar to a fish tank setup.

Covers for the system/parachutes can be used to protect the vertical aeroponic growing apparatus 10 and also to store the vertical aeroponic growing apparatus 10. The covers could resemble the system size and have pockets or additions to the material for functionality. The covers may be treated with a substance to prevent mold, cold, heat or bugs from affecting the system. The material can be any type of woven fabric or plastic such as those used for outdoor storage and protection. The cover can also be used as the shipping packaging or for parachute drops. The cover may include a parachute for foreign countries to receive the system by air drop. This can be achieved by attaching a parachute to any part of the vertical aeroponic growing apparatus.

Grow tents can be used to house the vertical aeroponic growing apparatus 10. The grow tents can be made from canvas. Mylar®, nylon, or some other kind of tent fabric. The grow tent can be made to collapse and are available on HTG Supply's website or any high tech gardening website. Typically, the grow tent is black on the outside to block light. The grow tent may also be white in color or be of some other color. The function of the grow tent is to grow plants 120 indoors and have a refractive interior to create a high lumimation or high light environment.

A barrel washer or washing machine can be used to clean the vertical aeroponic growing apparatus 10 and make the experience of growing plants 120 easier. The washing machine can be a hose, pressure washer, or hose system that plugs into each grow site. Each individual grow site receives a 1 inch flexible pipe and sticks into the hole during cleaning. The hose system can have a manifold that evenly distributes the water to each hose. This can be accomplished by stepping the pipe size down and increasing pressure to clean better.

Art designs can be added to the vertical aeroponic growing apparatus 10. Art graphics, pictures or customized templates may be created. The user can remove the designs and completely customize their gardening experience. Instructions and text could be added to the material creating a tutorial or log. The surface could also have a writable fabric or material that serves as a washable market board creating a washable experience to create art on the structure of the garden as well. The art designs may also affect insect species and how they interact with each color for pollination, benefiting the plants growth.

Thermal-Wrap Technology is a thermal layering process utilizing light refracting and heat refracting insulation. The Art Garden Growing System's are the only gardening systems utilizing this technology on the side of the growing structure. The reason for this is to achieve optimal plant root health and plant health by temperature regulation. Otherwise the sun is shining directly on the side of the vertical aeroponic growing apparatus 10. Without this technology, gardens fail to grow healthy plants 120 due to heat retention of the surface material causing heat and steam in the hollow structure 12. This technology will be a must for all systems in the future. We achieve this technology by hand selecting the best quality safe for food contact materials, and layer our thermal wrap depending on the exact model of Art Garden chosen. The material used is a refractive aluminized bubble insulation accompanied by a waterproof ballistic nylon canvas with a metal aluminized finish. The two are used in conjunction for most systems but the layers and materials used are not limited to the materials and number of layers above. All types of metal, fabric, plastic, or organic material such as wood polymers may be used. Specialty finishes may also be applied to the outermost portion of the structure to achieve reflectivity and distinct attributes for the grower. Complete customization can be done. Additions to the Thermal Wrap Technology may include wiring, lighting, displays such as gauges, ppm, temperatures, pockets, zippers, Velcro®, buttons, fasteners, or anything that embezzles the wraps. Thermal Wrap Technology also has the ability to have the function of a heat pad or heat band to be installed for increased germination viability. The heating may connect to the outermost portion of each grow site by sticking or attachment device. It may also attach directly to the wrap. Thermal Wrap Technology also has the ability to use a Peltier Pad for cooling of the inside portion of the wrap. It can utilize a fan and connect by wire lead to each of the wraps or atop the grow system inside a POD cap. All additions attach to the wrap by plastic coated copper wires.

The structure of Art Garden may be laid on its side and have a pipe driven through the center, from left to right. Multiple units may be installed on each pipe and create a long row. The pipe is sealed by a grommet or uni-seal. Irrigation is run through the pipe using tubing which allows for free rotation of the units. The tubing inside the housing will have quick connect coupler to create a water source for each unit. Each unit has misting heads like a traditional Art Garden. The long rows of units, with a pipe driven from left to right, may be rotated by hand or by a motor. A simple low geared, low revolution motor suffices. This creates a pulley and gear system from readymade materials to creates the motion we are achieving.

The Art Garden Growing System may be stacked one on top of another to create more growth in less floor space. We also have the ability to connect two units entirely together by removing the top and bottom walls, adding a topless unit to lock in, or connecting the bungholes for duel drain and irrigation combined.

The structure of a cylinder is our first creation, we are not limited to size and or shape of the structure when using the hole, grommet and fitting method. Any size or shape of this system can be created, half barrel, quarter barrel, a five gallon bucket. We can also use farm implement tanks to create a massive grow structure. We can always connect two of our units together if they provide a threaded or recessed port or hole to attach to.

The structure around the system can be a home, garage, basement, loft, attic, greenhouse, canopy, outside free from anything, or overhang/carport/rooftop, trailer, shipping container, A greenhouse can come equip with wind, solar, geothermal, rotation platforms, lighting, heating, cooling, fans, generators, computer systems, operating systems, wireless function, ART, smartphone apps, smart sensors, video monitors, and any form of technology to better the grow. The greenhouse may be very small and slightly bigger than one garden. The greenhouse can be a small greenhouse, in can be a hobby greenhouse, a medium greenhouse, a large greenhouse, or a commercially viable hoop house or bubble.

We may provide a DIY form of our system for customers who prefer to assemble the system. They may want materials in kit form including instructions and video tutorials/ART's assistance. The kit could include basic entities, such as: thermal wrap, grommets, fittings and system housings. The kit may also include any extra components, along with the key entities: pumps, filters, timers ART, and everything discussed in this document.

Art Garden may be personalized in any way. We can make changes to the structure of the system, such as grow site size, shape and number of grow sites. System may lay sideways, upright or upside-down. We may also make physical alterations to the structure, adding or subtracting physical matter.

The addition of mobility can be achieved with a mobile trailer or any trailer with slight modifications. The trailer can utilize openness or greenhouse walls or traditional trailer enclosed walls. All technology discussed in this document can be implemented to a mobile grow trailer.

A microscope can be added and this allows the user to analyze or determine what symbiotic bacteria is alive in and around the system. It uses a magnification tool and display or phone for viewing. Taking this technology to the next level and learning how to make your plants thrive using biological forces and determining the species is what we are doing here.

Stationary stands or display centers made from wood, steel or plastic may be incorporated to create an addition for Art Garden. The purpose being a place to house the system and its entities. Housings or pre-made stands of any shape, size and material may be used. A trellis can be attached to these stands along with any of the materials discussed above. This includes incapsulated greenhouse style designs for indoor/outdoor applications. Rolling stands or carts made from wood, steel or plastic may be incorporated to achieve mobility along with a housing for a full portable greenhouse atmosphere or just a single open cart. Placing the Art Garden on top of a readymade smart box or Roomba style machine could also be used to seek out the light throughout each day. Used indoors or outdoors, the machine would seek the sun and be programmed with sensors to seek the most viable location for the garden. It may sense storms or rain and have a safe zone to go to. This may be a simple way to have a garden not need a light in a home because it can find the light depending on the time of day by just going to the window that is receiving light.

Total Plant Nutrition (TPN) is a new form of plant nutrient measurement developed by "ART" the artificially intelligent garden. Trials and test prove that Art Garden's aeroponic plants use 75% less fertilized nutrient solution than other vertical gardens or hydroponic close looped systems. The way we administer the TPN or Total Plant Nutrition is by syringe, vial or needle in concentrated form. Bacterium may be added in the forms of tree saps to sugar canes and create a biological world best for plants "similar to the diversity of soil". This creates a new standard of administration of plant nutrients. Refrigeration of catalysts may require extra refrigerators packs and accessories with each system in the future. We have created TPN by sourcing readymade chemical formulas and natural formulas for each application. The accessories used to administer and utilize the mineral and bio-diverse compounds/mixes are readymade as well. The TPN formula can be administered and changed daily by the grower or "Art" and an auto dosing machine. The TPN can hang freely in a sealed bag, any colored bag or clear. It will hang from a small pole/rod and a hook that is pre-made. TPN also can be inside a insulated sealed tank/res.

USDA CERTIFIED ORGANIC and OMRI LISTED CERTIFIED ORGANIC have been Utilized with Art Garden with Ellepot media, a peat based media to grow in. Also Pre Empt fertilizer gives us a natural and organic version of our system.

Art Garden may be hung or hang from a harness. The aeroponics becomes truly Airoponics and floats in the air. The chain or straps used to achieve this may include any material, such as: rope, poly rope, wire, chains, metal hangers, pulleys, or strapping. The harness connects to the top caps or bungholes otherwise connected to the top lip of the unit with a hook and loop method or C clamp style component. The idea here is hanging the system to not take up floor space. Also to maximize production area.

Plants may be shipped inside the system or they can be directly sown and pre planted before the system ships to maximize ease of use for beginners. Users need to plug the system in and add water/nutrients to awaken the seeds. The units can be inoculated with beneficial nutrients and biological materials prior to shipment. This creates a starter for the user. Saps and juices are used for this along with minerals and nutrients.

Filtration manifolds have been assembled and constructed to filter the system to the lowest micron and mesh possible. Every filtration system is expandable and helps filter out impurities for the system.

Aquatec 8800 high flow pumps can be used in conjunction with high pressure fittings, tubing, valves, check valves, solenoids, timers, filters, bulkheads, grommets, fittings, and gauges and thermal wrap technology to embody the system's raw material list. Food and medical grade components are used. Larger pumps and larger filters are used for larger systems. We utilize food grade and food safe materials and are completely compliant with FDA and Water Quality Association.

Cooling and heating copper coils can be used to effectively heat or chill the water that is routed through the system. This is accomplished by coiling the tubing around a frozen or heated cylinder pipe. The next phase of cooling added can be a pre-made water chiller system.

Reverse osmosis systems can purify the water and increase productivity of the system. A pre-made reverse osmosis system can vary in size and shape.

The Art Garden Application can be downloaded for an interactive experiences and monitoring the system. The interface works with a service provided by Appypie or any service of that nature.

Helping our plants 120 grow stronger and repel infection with sound and music therapy along with frequency HTZ or Heartz manipulation. We achieve HAARP MUSIC or FREQUENCIES through applications like protocols but not limited to that one program to accomplish them. Teslas works recreated sound therapies in addition to melodies inside and around the root chamber or room.

Our micronized misting system has the ability to spray a high pressure mist of fine water droplets. The atomized mist is achieved with any combination of mist heads, any combination of pressures, and any combination of flow rates. This is completely expandable and the user has the ability to manipulate this in any way. We are not limited to brass spray heads, plastic heads, or Teflon® spray heads. The irrigation lines/psi lines used may be of any tubing style, size or color. We use food grade or medical grade everything for our system.

A large scale fogging system like Nutramist may be used, as well, for our system instead of micronized water alone. Single foggers or wet combo fogging systems with ultrasonic transmitters, such as Nutramist, can be utilized with Art Garden. Fogging can completely replace nearly all misting systems for some applications. We are not limited to what system we choose to use and have the ability to use the best system available.

Auto dosing machines such as Dosatron® can be added to Art Garden. A dosing machine will regulate the PH/PPM TDS/EC with a computer program. We are not limited to one style of dosing machine. Many can be chosen. This auto dosing program can be activated by the user or ART.

Art Garden is an artificially intelligent garden, artfully crafted with designs to choose from. The plants grow and create a work of Art, hence an Art Garden. Another option provides the growers with the ability to create physical drawings and "Art on the Garden", depending on if they choose the marker washable thermal wrap or glacier white metal wrap. What makes it even more original, its "ART". He is actually a digital being. Art's Startup allows you to meet the man behind the system, "Art". "ART" has a voice and can emit sound through speakers of the following previously invented, computer, laptop, tablet, ipad, iphone, ipad, Apple Watch, beats, wireless speakers. "ART" will have the option to project sound and music from the gardening system. "ART" is designed with the wisdom and knowledge of thousands of gardeners combined into one program/audiobank. "ART" is the true expert because he never forgets. "ART" can communicate with "ALEXA" and has a rather distinct voice to do that with. The video interface pictures an old man with bottle cap glasses. For his first task, "ART" helps every grower get growing. This starts with a person meeting "ART" and learning about him. The explanation of the assembly portion will soon follow that. "ART" goes through the basics of using the system, then covers subjects pertaining to things with references to such items as; media types, nutrient types, and seed choices. Years of knowledge can be uploaded and "ART" gets updated wirelessly or manually. "ART" can transcribe his words to text for people to print. "ART" will open browser windows, create lists on computers, and manage PPM/PH/TEMP/LUX measurements. "ART" is meant to do more, to create a wealth of knowledge like having heard thousands of peoples stories would create. The master gardener, the teacher, the tech guru, the farmer, the loving wife, the dreamer, the imaginative child, the minister, the dog, the stern father, the grandmother, the business executive, the promoter, the website designer, the surgeon, the nurse, the miracle. Who speaks to you is who you choose, some select the loving wife and some select the stern father. Everyone learns differently and the user can choose which program to run.

Reflection of negative radio waves and negative energy from the roots of the plants is possible with the thermal wrap technology. By utilizing our thermal wrap technology, the energy is reflected. Copper or other precious metals may be used with our thermal wrap technology. The purpose of this proposal is to diminish foreign radiation from several forms to the roots of the plants.

The grommets 46 used in the vertical aeroponic growing apparatus 10 can be formed from food grade: rubber, polymers, plastics, silicones or other food grade materials known to those skilled in the art.

The fittings 70 and 70' used in the vertical aeroponic growing apparatus 10 can be manufactured from any food or medical grade material, such as but not limited to: high density Polyethylene (HDPE), metals, food grade PVC, plastics, or rubbers.

A system similar to OSMO BOT can be added to determine statistical trends and measurements for the system. These include but are not limited to PH/PPM/EC/TDS/LIGHT/WATER/TEMP/HUMIDITY/LUX/TIMING etc. We are not limited to a single measurement system. We may also include smart lights, smart thermostats or smart applications to control this. All are previously invented and we can use that technology.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A vertical aeroponic growing apparatus, comprising:
   a) a hollow structure having a top wall, a sidewall, and a bottom wall, said top wall having a centrally located opening and two additional large openings formed therethrough, said two large openings being spaced 180° apart and each has a diameter of at least 4 inches for allowing a person's hand, forearm and upper arm to be easily inserted therethrough, said sidewall having a plurality of openings formed therethrough, and said bottom wall having an opening formed therethrough;
   b) a reservoir which can hold a quantity of nutrient laden water, said reservoir being spaced apart from said hollow structure;
   c) an outlet tube connecting said nutrient laden water housed in said reservoir to a filtration manifold located outside of said reservoir;
   d) a pump located downstream of said filtration manifold, said pump connected by a hollow tube to said filtration manifold;
   e) an irrigation tube connecting said pump to said centrally located opening formed in said top wall, said irrigation tube routing high pressure nutrient water from said pump to said hollow structure;
   f) a hollow wand positioned within said hollow structure and connected to said centrally located opening, said hollow wand having a nozzle attached to an end thereof for delivering a fine mist of nutrient laden water;
   g) a thermal, light refractive cover wrapped around said sidewall, said cover contains at least four layers and a plurality of openings are formed through said at least four layers, said thermal, light refractive cover having a first layer, a second layer, a third layer and a fourth layer, said first layer is both an anti-condensate and an infrared layer, said second layer is a thermal bubble layer, said third layer is a light refractive layer, and said fourth layer is an inflation layer positioned between said second layer and said third layer, and said plurality of openings formed in said cover corresponding in arrangement to said plurality of openings formed in said sidewall;
h) a fitting positioned in each of said plurality of openings in which a plant will be supported, each fitting permits roots of an individual plant to extend into said hollow structure, and said roots receive said fine mist of nutrient laden water;
i) a cap closing off any of said plurality of openings formed in said sidewall which are not needed to support said fitting;
j) a drain pipe secured to said opening formed in said bottom wall for allowing excess nutrient laden water to be removed from said hollow structure; and
k) a mechanical mechanism secured to said hollow structure for rotating said hollow structure.

2. The vertical aeroponic growing apparatus of claim 1 wherein said hollow structure is a cylindrical barrel formed from polypropylene, said top wall contains two smaller openings, each of which allows a piece of equipment to be connected to said hollow structure, said plurality of openings formed in said sidewall including from 40 to 50 openings each having a diameter of 0.5 inches or greater, each of said plurality of openings is surrounded by a food grade rubber grommet, each fitting frictionally engages into one of said grommets, said thermal, light refractive cover contains at least five layers, and said nutrient laden water has an oxygen content which ranges from between 30% to 75%.

3. The vertical aeroponic growing apparatus of claim 2 wherein said hollow structure can be rotated in at least one direction and oscillated by a mechanical mechanism, and said thermal, light refractive cover has an outside layer which is a light refractive layer, said sidewall has a surface area of 15 square feet, and said thermal, light reflective cover covers at least 98% of said sidewall.

4. The vertical aeroponic growing apparatus of claim 3 wherein said plurality of openings formed in said plurality of openings include an upper row of openings having two or more openings, and a trellis is secured to at least two of said openings in said upper row of openings, and said trellis extends at least 5 feet above said top wall of said hollow structure.

5. The vertical aeroponic growing apparatus of claim 2 wherein said thermal, light refractive cover is a multilayer laminate, said mechanical mechanism is spaced a short distance away from said bottom wall of said hollow structure, and said drain pipe passes through said mechanical mechanism.

6. The vertical aeroponic growing apparatus of claim 5 wherein said at least five layers of said multilayer laminate further include said first layer is positioned adjacent to said sidewall of said hollow structure and a fifth layer of said at least five layers, wherein the fifth layer is a thin steel material capable of reflecting light and adding strength to said thermal, light refractive cover, and said thermal, light refractive cover can refract from 80% to 98% of the light which contacts it.

7. The vertical aeroponic growing apparatus of claim 1 wherein said vertical aeroponic growing apparatus is mounted on a mechanical mechanism which will rotate said hollow structure both clockwise or counterclockwise, said nutrient laden water has an oxygen content which ranges from between 30% to 75%, and a surface area of said sidewall of said hollow structure is 30 square feet.

8. The vertical aeroponic growing apparatus of claim 1 wherein said plurality of openings formed in said sidewall range from 40 to 50 openings, each of said fittings includes a hollow member bent at an angle of from between 90° to 135°, each fitting has a diameter of at least 1.6 inches, and said sidewall has a surface area of 15 square feet, and said thermal, light refractive cover covers 90% of said sidewall.

9. The vertical aeroponic growing apparatus of claim 1 wherein wherein each diameter of said two large openings formed in said top wall ranges from 4 inches to 6 inches.

10. A vertical aeroponic growing apparatus, comprising:
a) a hollow structure having a top wall, a sidewall, and a bottom wall, said top wall having a centrally located opening and two additional large openings formed therethrough, said two large openings being spaced 180° apart and each has a diameter ranging from 4 inches to 6 inches for allowing a person's hand, forearm and upper arm to be easily inserted therethrough, said sidewall having a plurality of openings formed therethrough, and said bottom wall having an opening formed therethrough;
b) a reservoir which can hold at least 5 gallons of nutrient laden water, said reservoir being spaced apart from said hollow structure;
c) an outlet tube connecting said nutrient laden water housed in said reservoir to a filtration manifold located outside of said reservoir;
d) a pump located downstream of said filtration manifold, said pump connected by a hollow tube to said filtration manifold;
e) an irrigation tube connecting said pump to said centrally located opening formed in said top wall, said irrigation tube routing high pressure nutrient laden water from said pump to said hollow structure, and said irrigation tube is wrapped in a reflective tape;
f) a hollow wand positioned within said hollow structure and connected to said centrally located opening, said hollow wand branching sideways into two hollow tubes, and each of said two hollow tubes having an end, and a nozzle attached to each of said ends for delivering a fine mist of nutrient laden water;
g) a thermal, light refractive cover wrapped around said sidewall, said covering having a plurality of openings formed therethrough which correspond to said plurality of openings formed in said sidewall, said thermal, light refractive cover having a first layer, a second layer and a third layer, said first layer is both an anti-condensate and an infrared layer, said second layer is a thermal bubble layer, and said third layer is a light refractive layer;
h) a fitting positioned in each of said plurality of openings in which a plant will be supported, each fitting permits roots of an individual plant to extend into said hollow structure and receive said fine mist of nutrient laden water,
i) a cap closing off any of said plurality of openings formed in said sidewall which are not needed to support said fitting;
j) a drain pipe secured to said opening formed in said bottom wall for allowing excess water to be removed from said hollow structure; and
k) a mechanical mechanism secured to said hollow structure for rotating and oscillating said hollow structure.

11. The vertical aeroponic growing apparatus of claim 10 wherein said thermal, light refractive cover include a fourth layer which is an inflation layer positioned between said second layer and said third layer, said nutrient laden water contains from between 200 ppm to 1,500 ppm of a nutrient, said thermal, light refractive cover has a surface area of 20 square feet and said thermal, light refractive cover covers 95% of said sidewall, said top wall of said hollow structure is formed from a different material than said sidewall of said hollow structure, said hollow structure is a 55 gallon drum formed from fiberglass, and said nutrient laden water has an oxygen content which ranges from between 30% to 75%.

12. The vertical aeroponic growing apparatus of claim 10 wherein said thermal, light refractive cover include a fifth layer which is a fabric layer, said high pressure nutrient laden water is at a pressure from between 50 psi to 200 psi said thermal, light refractive cover has a surface area of 25 square feet and said thermal, light refractive cover covers 95% of said sidewall, said top wall of said hollow structure is formed from the same material as said sidewall of said hollow structure, and said hollow structure is formed from plastic.

13. The vertical aeroponic growing apparatus of claim 10 wherein said wherein each diameter of said two large openings formed in said top wall ranges from 4 inches to 8 inches, said top wall contains two smaller openings each of which allow a piece of equipment to be connected to said hollow structure, and said two smaller openings each have a diameter ranging from between 0.5 inches to 3 inches.

14. The vertical aeroponic growing apparatus of claim 13 wherein said sidewall has between 40 to 50 openings formed therein, each of said openings has a diameter of greater than 1 inch, and said openings are arranged in a predetermined pattern which includes a top row having two or more openings, and each of said two or more openings in said top row receiving a fastener for securing a trellis to said hollow structure, said trellis extending upward from said hollow structure at least 6 feet.

15. The vertical aeroponic growing apparatus of claim 10 wherein a first surveillance camera is positioned within said hollow structure and a second surveillance camera is positioned outside of said hollow structure, and said vertical aeroponic growing apparatus is monitored by a sensor system which monitors air temperature, water temperature, the level of dissolved oxygen, water level, pH level, nutrient levels and biological activity within said hollow structure.

16. A vertical aeroponic growing apparatus, comprising:
    a) a hollow structure having a top wall, a sidewall, and a bottom wall, said top wall having a centrally located opening, two additional large openings and two smaller openings formed therethrough, said two large openings being spaced 180° apart and each has a diameter of from 4 inches to 8 inches for allowing a person's hand, forearm and upper arm to be easily inserted therethrough, said two smaller openings allowing a piece of equipment to be connected to said hollow structure, said sidewall having a plurality of openings formed therethrough, and said bottom wall having an opening formed therethrough;
    b) a reservoir which can hold from between 5 gallons to 1.000 gallons of nutrient laden water, said reservoir being spaced apart from said hollow structure;
    c) an outlet tube connecting said nutrient laden water housed in said reservoir to a filtration manifold located outside of said reservoir;
    d) a pump located downstream of said filtration manifold, said pump connected by a hollow tube to said filtration manifold;
    e) an irrigation tube connecting said pump to said centrally located opening formed in said top wall, said irrigation tube routing high pressure nutrient laden water from said pump to said hollow structure;
    f) a hollow wand positioned within said hollow structure and connected to said centrally located opening, said hollow wand branching sideways into two hollow tubes, and each of said two hollow tubes having an end with a nozzle attached thereto for delivering a fine mist of nutrient laden water;
    g) a thermal, light refractive cover wrapped around said sidewall, said covering having a plurality of openings formed therethrough which correspond to said plurality of openings formed in said sidewall, said thermal, light refractive cover having a first layer, a second layer, a third layer and a fourth layer, said first layer is both an anti-condensate and an infrared layer, said second layer is a thermal bubble layer, said third layer is a light refractive layer, and said fourth layer is an inflation layer positioned between said second layer and said third layer;
    h) a fitting positioned in each of said plurality of openings in which a plant will be supported, each fitting permits roots of an individual plant to extend into said hollow structure, and said roots receive said fine mist of nutrient laden water;
    i) a cap closing off any of said plurality of openings formed in said sidewall which are not needed to support said fitting;
    j) a drain pipe secured to said opening formed in said bottom wall for allowing excess water to be removed from said hollow structure; and
    k) a mechanical mechanism secured to said hollow structure for rotating said hollow structure.

17. The vertical aeroponic growing apparatus of claim 16 wherein said mechanical mechanism is spaced a short distance away from said bottom wall of said hollow structure, said drain pipe passes through said mechanical mechanism, each of said two smaller openings of said top wall allows a piece of equipment to be connected to said hollow structure, and said two smaller openings each have a diameter ranging from between 0.5 inches to 3 inches.

18. The vertical aeroponic growing apparatus of claim 16 wherein said mechanical mechanism is secured to said bottom wall of said hollow structure, and said nutrient laden water has an oxygen content which ranges from between 30% to 75%.

19. The vertical aeroponic growing apparatus of claim 16 wherein said sidewall has a surface area of 15 square feet, and said thermal, light reflective cover covers at least 98% of said sidewall.

20. The vertical aeroponic growing apparatus of claim 16 wherein said plurality of openings formed in said sidewall of said hollow structure number from 40 to 50 openings and each opening has a diameter ranging from 0.7 inches to 3 inches, said plurality of openings include an upper row of openings having two or more openings, and a trellis is secured to two openings in said upper row of openings, and said trellis extends at least 5 feet above said top wall of said hollow structure.

* * * * *